US010200125B2

(12) United States Patent
Cho et al.

(10) Patent No.: US 10,200,125 B2
(45) Date of Patent: Feb. 5, 2019

(54) RADIO-OVER-FIBER (ROF) TRANSMISSION SYSTEM

(71) Applicant: ELECTRONICS AND TELECOMMUNICATIONS RESEARCH INSTITUTE, Daejeon (KR)

(72) Inventors: Seung Hyun Cho, Sejong (KR); Jong Hyun Lee, Daejeon (KR); Hwan Seok Chung, Daejeon (KR); Sun Me Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/337,119

(22) Filed: Oct. 28, 2016

(65) Prior Publication Data

US 2017/0126320 A1     May 4, 2017

(30) Foreign Application Priority Data

Oct. 29, 2015  (KR) .................. 10-2015-0151281
May 2, 2016   (KR) .................. 10-2016-0054270
(Continued)

(51) Int. Cl.
*H04B 10/2575*  (2013.01)
*H04B 10/27*    (2013.01)
*H04B 7/0413*   (2017.01)

(52) U.S. Cl.
CPC ..... *H04B 10/25754* (2013.01); *H04B 7/0413* (2013.01)

(58) Field of Classification Search
CPC ... H04B 10/2575; H04B 10/27; H04B 7/0413
See application file for complete search history.

(56) References Cited

U.S. PATENT DOCUMENTS 5,317,440  A      5/1994  Hsu
2007/0047878  A1  3/2007  Choi et al.
(Continued)

FOREIGN PATENT DOCUMENTS

KR   10-2008-0104692 A   12/2008
KR   10-1142458 B1       5/2012

OTHER PUBLICATIONS

Seung-Hyun Cho et al., "Proposal to include several RoF system architecture in the G.RoF draft document", Oct. 7, 2015, ETRI and SK Telecom.
(Continued)

*Primary Examiner* — Mina M Shalaby
(74) *Attorney, Agent, or Firm* — LRK Patent Law Firm

(57) ABSTRACT

A radio-over-fiber (RoF) transmission system includes at least one baseband unit (BBU) connected to a core network of a service provider that provides a mobile Internet service, an optical line terminal (OLT) configured to convert a radio signal received from the at least one BBU into an optical signal, an optical distribution network (ODN) comprising an optical fiber and an optical splitter, at least one optical network unit (ONU) configured to receive the optical signal from the OLT via the ODN and convert the optical signal into a radio signal, and at least one remote radio head (RRH) configured to receive the radio signal from the at least one ONU and output the radio signal via a plurality of antennas.

1 Claim, 8 Drawing Sheets

(30) Foreign Application Priority Data

Jun. 21, 2016 (KR) ........................ 10-2016-0077504
Oct. 18, 2016 (KR) ........................ 10-2016-0135166

(56) References Cited

U.S. PATENT DOCUMENTS

2007/0258432 A1    11/2007  Lee et al.
2009/0175365 A1     7/2009  Jun, II
2016/0374138 A1*   12/2016  Dai .................. H04W 72/0426

OTHER PUBLICATIONS

Seung-Hyun Cho et al., "Proposal of G.RoF System Architecture", Dec. 9, 2015, ETRI.
"Report of the Q215 meeting", Feb. 2016. International Telecommunication Union.

* cited by examiner

300

400

RADIO-OVER-FIBER (ROF) TRANSMISSION SYSTEM

CROSS-REFERENCE TO RELATED APPLICATION(S)

This application claims the priority benefit of Korean Patent Application No. 10-2015-0151281 filed on Oct. 29, 2015, Korean Patent Application No. 10-2016-0054270 filed on May 2, 2016, Korean Patent Application No. 10-2016-0077504 filed on Jun. 21, 2016, and Korean Patent Application No. 10-2016-0135166 filed on Oct. 18, 2016, in the Korean Intellectual Property Office, the disclosures of which are incorporated herein by reference for all purposes.

BACKGROUND

1. Field

One or more example embodiments relate to a radio-over-fiber (RoF) transmission system.

2. Description of Related Art

Recently, a high-speed mobile communication network has rapidly switched to a cloud base station with a mobile fronthaul using a common public radio interface (CPRI)/open base station architecture initiative (OBSAI) based digital optical transmission scheme which is divided into a digital unit (DU) and a radio unit (RU). However, in a case in which the current digital optical transmission technology is utilized to establish a fifth-generation mobile communication network that may provide an ultra-wide band service, a great network establishing cost may be incurred, and thus it may be difficult to establish a commercial network. Therefore, a new type of mobile fronthaul optical communication technology that may have a simple structure and support economical establishment and management of a cloud base station is demanded. A simply structured, cost-efficient analog RoF transmission scheme is discussed globally as a potential candidate for the new type of mobile fronthaul optical communication technology.

SUMMARY

An aspect provides a radio-over-fiber (RoF) transmission system that may provide a user with a high-speed mobile Internet service using a high-capacity optical distribution network (ODN).

According to an aspect, there is provided an RoF transmission system including at least one baseband unit (BBU) connected to a core network of a service provider that provides a mobile Internet service, an optical line terminal (OLT) configured to convert a radio signal received from the at least one BBU into an optical signal, an ODN including an optical fiber and an optical splitter, at least one optical network unit (ONU) configured to receive the optical signal from the OLT via the ODN and convert the optical signal into a radio signal, and at least one remote radio head (RRH) configured to receive the radio signal from the at least one ONU and output the radio signal via a plurality of antennas.

The OLT may be connected to the at least one BBU via a service node interface (SNI) corresponding to a first reference point.

The first reference point may be utilized to define a signal type and an allowable signal delay or latency between the OLT and the at least one BBU.

Each of the at least one ONU may be connected to the at least one RRH via a user node interface (UNI) corresponding to a second reference point.

The second reference point may be utilized to define a signal type and an allowable signal delay or latency between the at least one ONU and the at least one RRH.

The at least one RRH may include a radio frequency (RF) circuitry of a base station and a frequency up/down converter.

Each of the at least one RRH may include a plurality of antennas equipped with an amplifier to support a multiple-input and multiple-output (MIMO) configuration.

When the RoF transmission system has a point-to-point configuration, a single ONU may be connected to the ODN.

When the RoF transmission system has a point-to-multipoint configuration, a plurality of ONUs may be connected to the ODN in a star-shaped or ring-shaped topology.

According to another aspect, there is also provided an RoF transmission system including at least one BBU connected to a core network of a service provider, and an OLT connected to the at least one BBU via an SNI corresponding to a reference point, and configured to convert a radio signal received from the at least one BBU into an optical signal, wherein the optical signal may be transmitted to at least one ONU connected to at least one RRH via an ODN including an optical fiber and an optical splitter.

According to still another aspect, there is also provided an RoF transmission system including an ONU configured to receive an optical signal output from an OLT via an ODN and convert the optical signal into a radio signal, and at least one RRH connected to the ONU via a UNI corresponding to a reference point, and configured to output the radio signal received from the ONU via a plurality of antennas.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
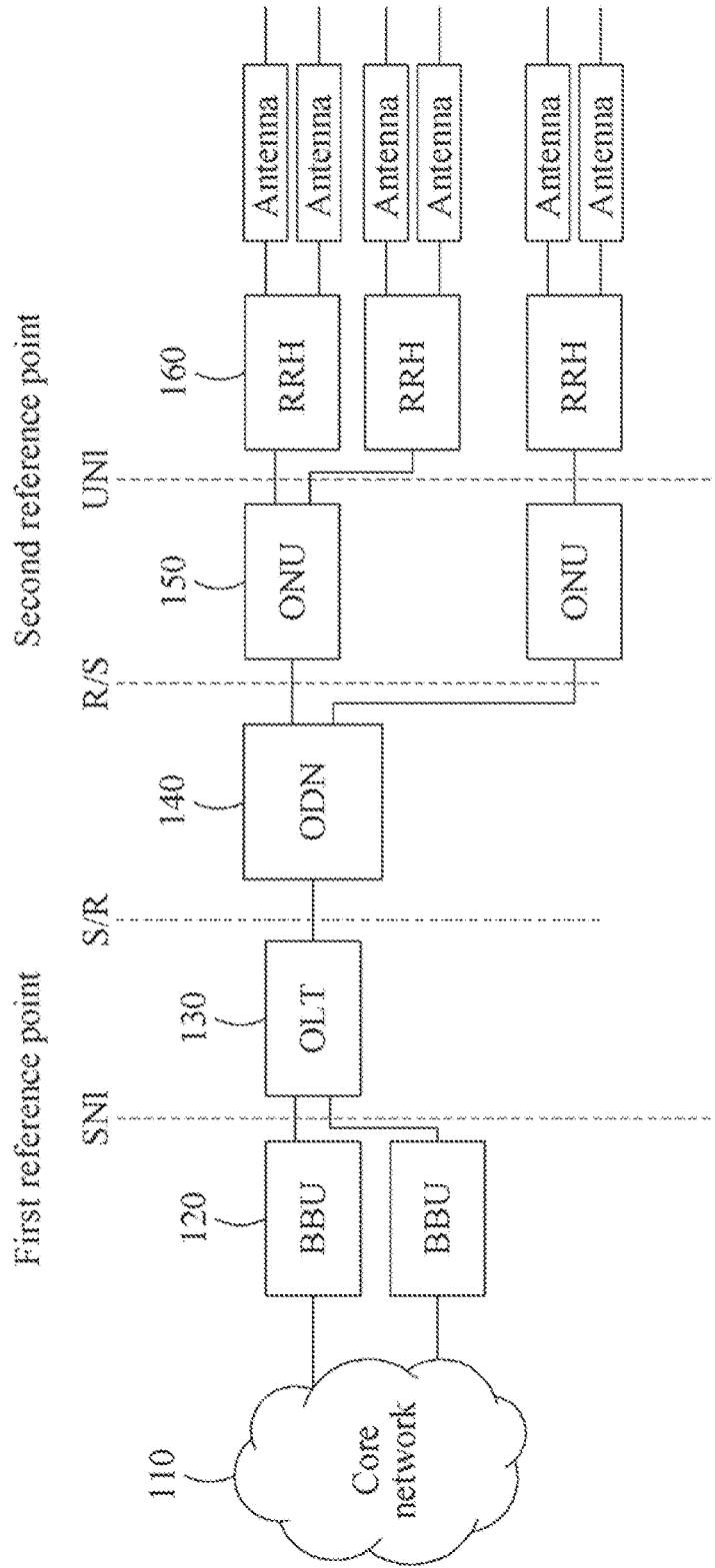
FIG. 1 is a diagram illustrating a configuration of a radio-over-fiber (RoF) transmission system according to an example embodiment.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

In case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating a configuration of a radio-over-fiber (RoF) transmission system according to an example embodiment.

Referring to FIG. 1, the RoF transmission system may include at least one baseband unit (BBU) 120 connected to a core network 110 of a service provider. The BBU 120 may be connected to the core network 110 to provide various mobile Internet services. The BBU 120 may generate a baseband radio signal. The BBU 120 may be included in the RoF transmission system to support a mobile communication system. The BBU 120 may be included in a central office (CO) in which a communication device is installed to provide a subscriber with an information and communications service.

The RoF transmission system may further include an optical line terminal (OLT) 130 configured to convert the radio signal received from the at least one BBU 120 into an optical signal. The OLT 130 may be connected to the at least one BBU 120 via a service node interface (SNI) corresponding to a first reference point. The first reference point may be utilized to define a signal type and an allowable signal delay or latency between the OLT 130 and the at least one BBU 120. The SNI may be set differently based on a service provided by the service provider.

The OLT 130 may be connected directly to the at least one BBU 120. The OLT 130 may be included in the CO. The OLT 130 may be connected to the at least one BBU 120 to maximize a transmission capacity of the RoF transmission system. In the example of FIG. 1, the OLT 130 may accept a total of two BBUs 120, and thus the RoF transmission system may be utilized more efficiently.

When the OLT 130 receives a plurality of radio signals from the at least one BBU 120, the OLT 130 may aggregate the plurality of radio signals to utilize an existing optical infrastructure efficiently. A BBU 120 may transmit a plurality of radio signals to the OLT 130. The OLT 130 may simultaneously receive radio signals from the two BBUs 120 connected thereto, respectively. In this example, the OLT 130 may generate an optical signal by multiplexing the received plurality of radio signals.

The RoF transmission system may further include an optical distribution network (ODN) 140 including an optical fiber and an optical splitter. The ODN 140 may include the optical fiber as a transmission medium. When distributing the signal output from the OLT 130 to a plurality of optical network units (ONUs) 150, the optical splitter may distribute the signal such that a predetermined or greater intensity of the signal is maintained. Through this, the optical splitter may provide a plurality of connections between at least one OLT 130 and the plurality of ONUs 150.

The RoF transmission system may further include the at least one ONU 150 configured to receive the optical signal from the OLT 130 via the ODN 140 and convert the optical signal into a radio signal. The ONU 150 may be disposed at a site remote from the CO. The OLT 130, the ODN 140, and the ONU 150 may comply with GRoF standards of the International Telecommunication Union-Telecommunication Standardization Sector (ITU-T).

The RoF transmission system may further include at least one remote radio head (RRH) 160 configured to receive the radio signal from the ONU 150 and output the radio signal via a plurality of antennas. The ONU 150 may be connected to the RRH 160 via a user node interface (UNI) corresponding to a second reference point. The second reference point may be utilized to define a signal type and an allowable signal delay or latency between the ONU 150 and the at least one RRH 160. The UNI may be set differently based on the service provided by the service provider. That is, the signal type, the allowable signal delay, or the allowable latency of the SNI or the UNI may depend on the service provided using the RoF transmission system.

The RRH 160 may in a radio frequency (RF) circuitry and a frequency up/down converter. The RRH 160 may include a plurality of antennas equipped with amplifiers to support a multiple-input and multiple-output (MIMO) configuration. The RRH 160 may include, as the amplifiers, a high power amplifier and a low noise amplifier for transmission and reception. Each of the at least one RRH 160 connected to the ONU 150 may cover a different sector, frequency allocation (FA), and antenna.

A frequency of the optical signal transmitted via the ODN 140 may be the same as or different from a frequency of the radio signal used by the ONU 150. A scheme of setting the frequency of the optical signal transmitted via the ODN 140 to be the same as the frequency of the radio signal used by the ONU 150 and transmitting the optical signal is referred to as radio frequency-over-fiber (RFoF). A scheme of setting the frequency of the optical signal transmitted via the ODN 140 to a frequency other than the frequency of the radio signal used by the ONU 150 and transmitting the optical signal is referred to as an intermediate frequency-over-fiber (IFoF). In this example, the frequency of the optical signal transmitted via the ODN 140 may be determined to be a frequency between a frequency corresponding to a baseband of the BBU 120 and the frequency of the radio signal of the ONU 150. In IFoF, the frequency of the optical signal transmitted via the ODN 140 is referred to as an intermediate frequency (IF).

An interface S is a point on the optical fiber immediately subsequent to an optical connection point, for example, an optical connector or optical splice, of the OLT 130 (downstream) or the ONU 150 (upstream). An interface R is a point on the optical fiber immediately subsequent to an optical connection point, for example, an optical connector or optical splice, of the ONU 150 (downstream) or the OLT 130 (upstream).

The above description of the RoF transmission system is provided based on a downstream direction in which data is transmitted from the core network 110 to the subscriber of the ONU 150. Hereinafter, the RoF transmission system will be described based on an upstream direction in which data is transmitted from the subscriber of the ONU 150 to the core network 110.

The RRH 160 may receive a radio signal transmitted by a terminal of the subscriber of the ONU 150 via the antenna. The received radio signal may be converted into an optical signal by the ONU 150. The ONU 150 may transmit the optical signal to the OLT 130 via the ODN 140.

The OLT 130 may convert the received optical signal into a radio signal. The OLT 130 may de-aggregate the multiplexed optical signal received from ONU 150, in relation to aggregation of the plurality of radio signals received from the at least one BBU 120. The ONU 150 may transmit, to the OLT 130, the optical signal multiplexed using wavelength-division-multiplexing (WDM). The OLT 130 may simultaneously receive optical signals from the two ONUs 150 connected thereto, respectively. In this example, the OLT 130 may de-multiplex the received plurality of optical signals.

As described above, since the OLT 130 supports multiplexing/de-multiplexing, the capacity of the RoF transmission system may increase although an additional optical fiber is not added to the ODN 140. Thus, the RoF transmission system may utilize the existing optical infrastructure efficiently.

The OLT 130 may transmit the radio signal to the BBU 120. When the BBU 120 transmits the received radio signal to the core network 110, the data from the terminal of the subscriber of the ONU 150 may be transferred to the core network 110. Through this, data of a subscriber of a mobile Internet service may be transferred rapidly to the core network 110 via the optical fiber. Similarly, data may be provided rapidly in the downstream direction to the subscriber of the mobile Internet service using the optical fiber. Therefore, the capacity and transmission rate of the mobile Internet service may increase.

The configuration of the RoF transmission system may depend on a connection between the OLT 130 and the ONU 150. Hereinafter, other configurations of the RoF transmission system will be described with reference to the drawings.

Figure 2:
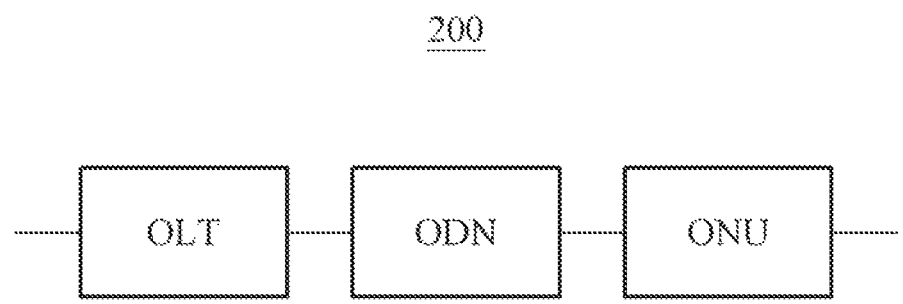
FIG. 2 is a diagram illustrating a point-to-point configuration of an RoF transmission system according to an example embodiment.

FIG. 2 is a diagram illustrating a point-to-point configuration of an RoF transmission system 200 according to an example embodiment. Referring to FIG. 2, the point-to-point configuration of the RoF transmission system 200 is a configuration in which a single ONU is connected to an ODN. The RoF transmission system 200 has a configuration in which a single OLT is connected to the single ONU via the single ODN. The ODN of the RoF transmission system 200 may include only an optical fiber, except for an optical splitter.

Figure 3:
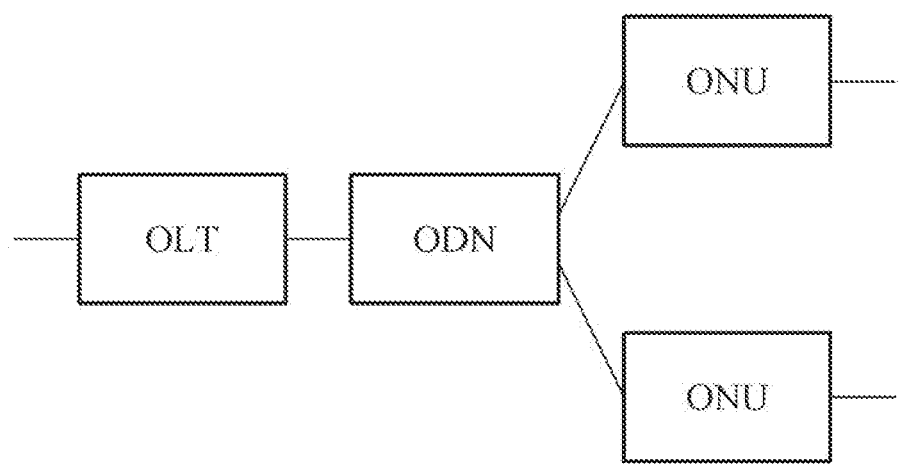
FIG. 3 is a diagram illustrating a star-shaped point-to-multipoint configuration of an RoF transmission system according to an example embodiment.

FIG. 3 is a diagram illustrating a star-shaped point-to-multipoint configuration of an RoF transmission system 300 according to an example embodiment. Referring to FIG. 3, the point-to-multipoint configuration of the RoF transmission system 300 is a configuration in which a plurality of ONUs are connected to an ODN. The RoF transmission system 300 has a configuration in which a single our is connected to the plurality of ONUs via the single ODN. The ODN of the RoF transmission system 300 may distribute an optical signal to the plurality of ONUs using an optical splitter of the OLT. The optical signal output from the OLT may be transmitted to all the ONUs, and an optical signal output from an ONU may be received by only the OLT.

Figure 4:
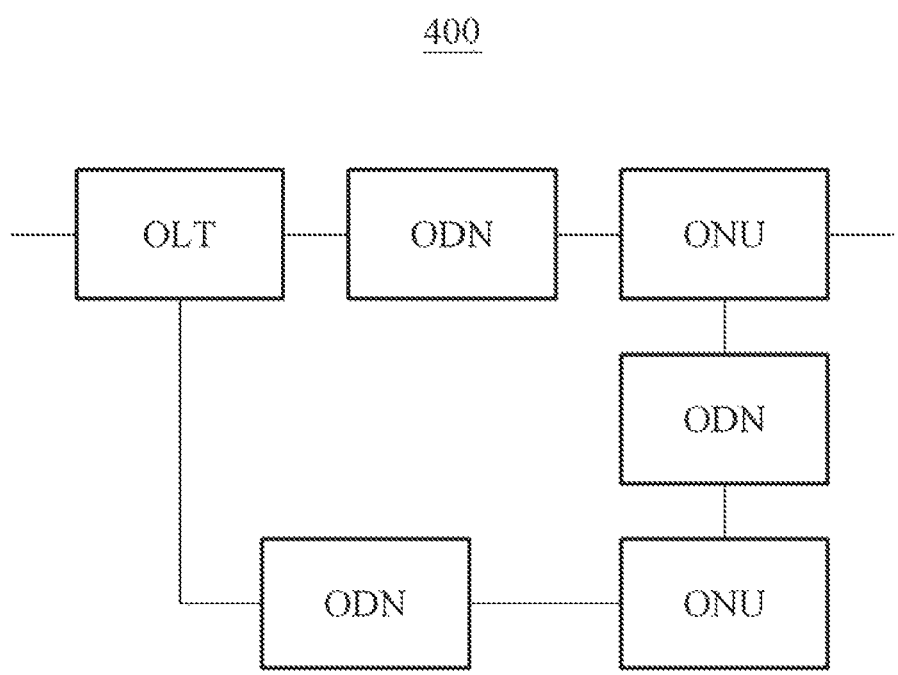
FIG. 4 is a diagram illustrating a ring-shaped point-to-multipoint configuration of an RoF transmission system according to an example embodiment.

FIG. 4 is a diagram illustrating a ring-shaped point-to-multipoint configuration of an RoF transmission system 400 according to an example embodiment. Referring to FIG. 4, an OLT may be connected to a plurality of ONUs via a plurality of ODNs that comply with a ring-shaped network topology.

The configurations of the RoF transmission system described with reference to FIGS. 2 through 4 may be logical link or physical link topologies of the RoF transmission system.

Figure 5:
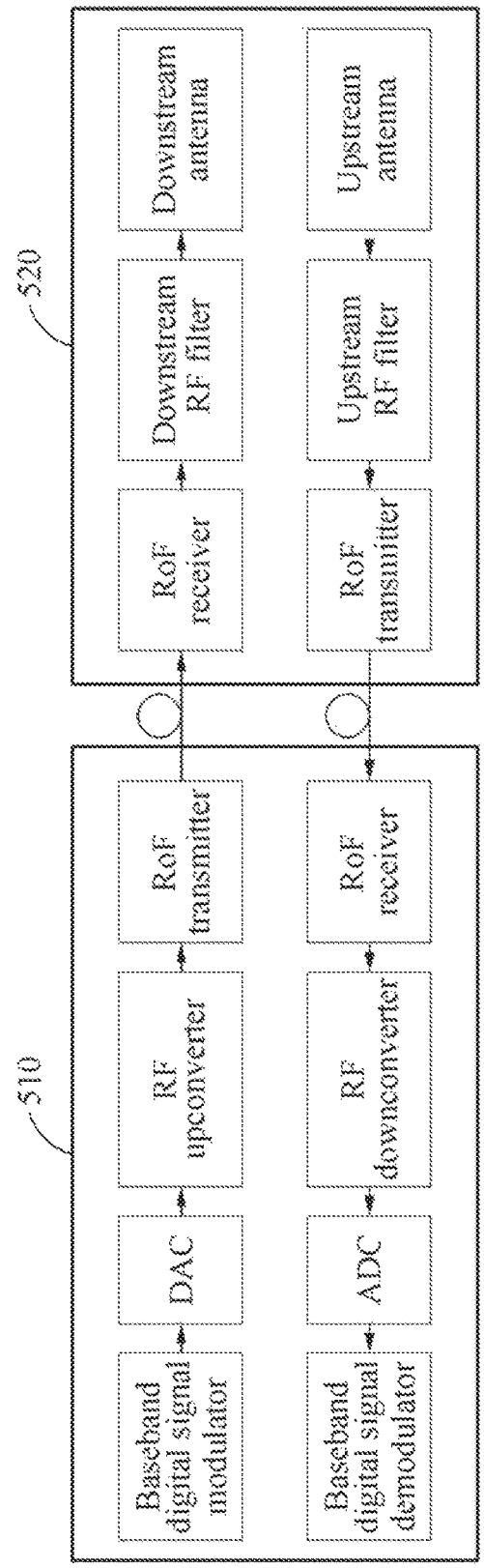
FIG. 5 is a diagram illustrating a configuration of a radio frequency-over-fiber (RFoF) based single channel RoF transmission system according to an example embodiment.

FIG. 5 is a diagram illustrating a configuration of an RFoF based single channel RoF transmission system according to an example embodiment. Referring to FIG. 5, the single channel RoF transmission system may include a BBU 510 and an RRH 520. The BBU 510 may be disposed in a CO, and the RRH 520 may be disposed at a site remote from the CO.

The BBU 510 may be divided into a portion that transmits an optical signal with respect to a downstream direction, and a portion that receives an optical signal with respect to an upstream direction. The BBU 510 may include, as constituents associated with the downstream direction, a baseband digital signal modulator, a digital-to-analog converter (DAC), an RF upconverter, and an RoF transmitter. The BBU 510 may include, as constituents associated with the upstream direction, a baseband digital signal demodulator, an analog-to-digital converter (ADC), an RF downconverter, and an RoF receiver.

The RRH 520 may be divided into constituents with respect to a downstream direction, and constituents with respect to an upstream direction. The RRH 520 may include, as the constituents with respect to the downstream direction, an RoF receiver, a downstream RF filter, and a downstream antenna. The RRH 520 may include, as the constituents with respect to the upstream direction, an RoF transmitter, an upstream RF filter, and an upstream antenna.

With respect to the downstream direction, the baseband digital signal modulator may generate a baseband digital downlink signal to be transmitted to each subscriber. The DAC may convert the baseband digital downlink signal into an analog downlink signal. The RF upconverter may increase a frequency of the analog downlink signal to transmit the analog downlink signal wirelessly. The analog downlink signal output from the RF upconverter may be an electrical signal. The RoF transmitter may convert the frequency-shifted analog downlink signal into an optical signal for analog optical transmission. The BBU 510 may output the optical signal to the RRH 520.

The RRH 520 may convert the optical signal received via the RoF receiver into an electrical signal. The electrical signal may pass through the downstream RF filter and the downstream antenna, and be output as a radio signal to the air. Finally, a terminal of the subscriber may receive the radio signal.

With respect to the upstream direction, an uplink signal generated by the terminal of the subscriber may be transmitted to the upstream antenna of the RRH 520. The upstream RF filter may filter the radio signal transmitted to the upstream antenna. The RoF transmitter may convert the radio signal into an optical signal, for example, an optical uplink signal. The optical uplink signal may be transmitted to the BBU 510 via an optical fiber. The BBU 510 may receive the optical uplink signal via the RoF receiver, and convert a frequency of the optical uplink signal to a frequency corresponding to a digital baseband using the RoF downconverter. Finally, the digital baseband uplink signal having the frequency corresponding to the digital baseband may be demodulated by the baseband digital signal demodulator.

Figure 6:
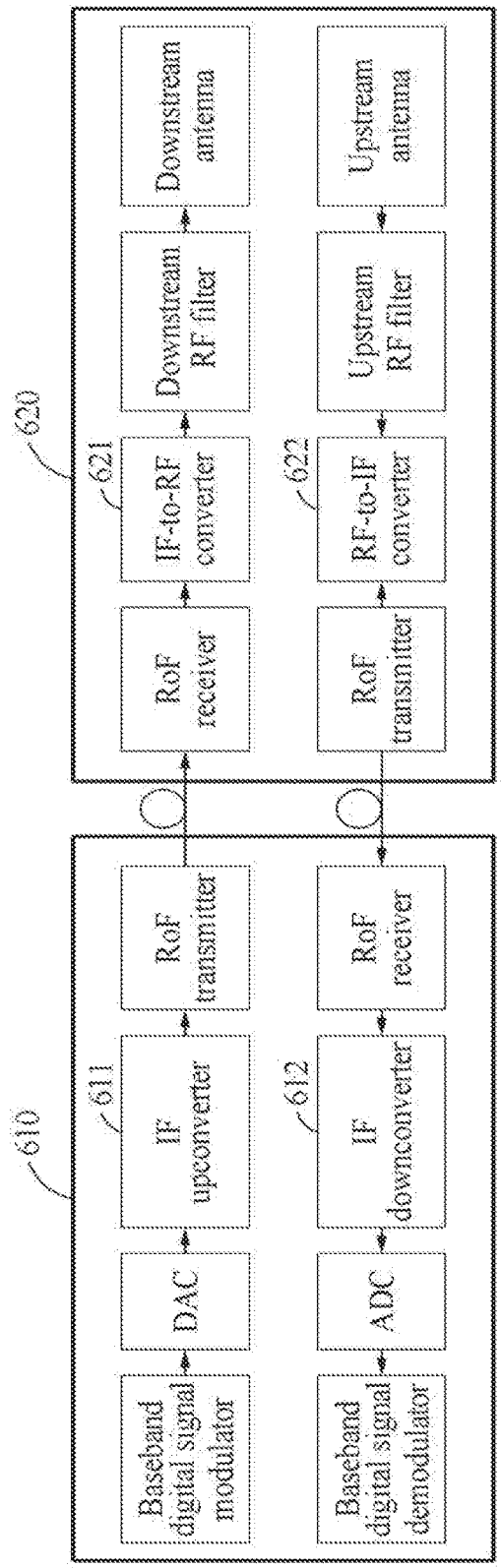
FIG. 6 is a diagram illustrating a configuration of an intermediate frequency-over-fiber (IFoF) based single channel RoF transmission system according to an example embodiment.

FIG. 6 is a diagram illustrating a configuration of an IFoF based single channel RoF transmission system according to an example embodiment.

Referring to FIG. 6, a single IF signal may be transmitted via an optical fiber disposed between a BBU 610 and an RRH 620. In a downstream direction, the BBU 610 may further include an IF upconverter 611 configured to change a frequency of an analog downlink signal received from a DAC to an IF. The analog downlink signal from the IF upconverter 611 may be output to the RRH 620 via an RoF transmitter.

In the downstream direction, the RRH 620 may further include an IF-to-RF converter 621 configured to convert an IF radio signal output from an RoF receiver to a radio signal of a frequency to be used by a downstream antenna, hereinafter, an RF. The RF radio signal from the IF-to-RF converter 621 may be transmitted to a terminal of a subscriber via a downstream RF filter and the downstream antenna.

In an upstream direction, the RRH 620 may further include an RF-to-IF converter 622 configured to convert a RF radio signal received from an upstream antenna to an IF radio signal to be used by an RoF transmitter of the RRH 620. The IF radio signal may be transmitted to the RoF transmitter. Thus, the RoF transmitter may convert the IF radio signal into an optical uplink signal. The optical uplink signal may be transmitted to the BBU 610 via an optical fiber.

In the upstream direction, the BBU 610 may receive the IF optical uplink signal from the RRH 620 via an RoF receiver. The BBU 610 may convert the IF optical uplink signal into an optical uplink signal of a frequency corresponding to a baseband via an IF downconverter 612. The IF downconverter 612 may transmit the optical uplink signal to an ADC.

When comparing the RFoF based single channel RoF transmission system of FIG. 5 and the IFoF based single channel RoF transmission system of FIG. 6, the RRH 620 may further include the IF-to-RF converter 621 and the RF-to-IF converter 622 that are configured to perform conversion between an RF and an IF. Further, the IFoF based single channel RoF transmission system may need to perform frequency synchronization in an IF-to-RF conversion process.

Figure 7:
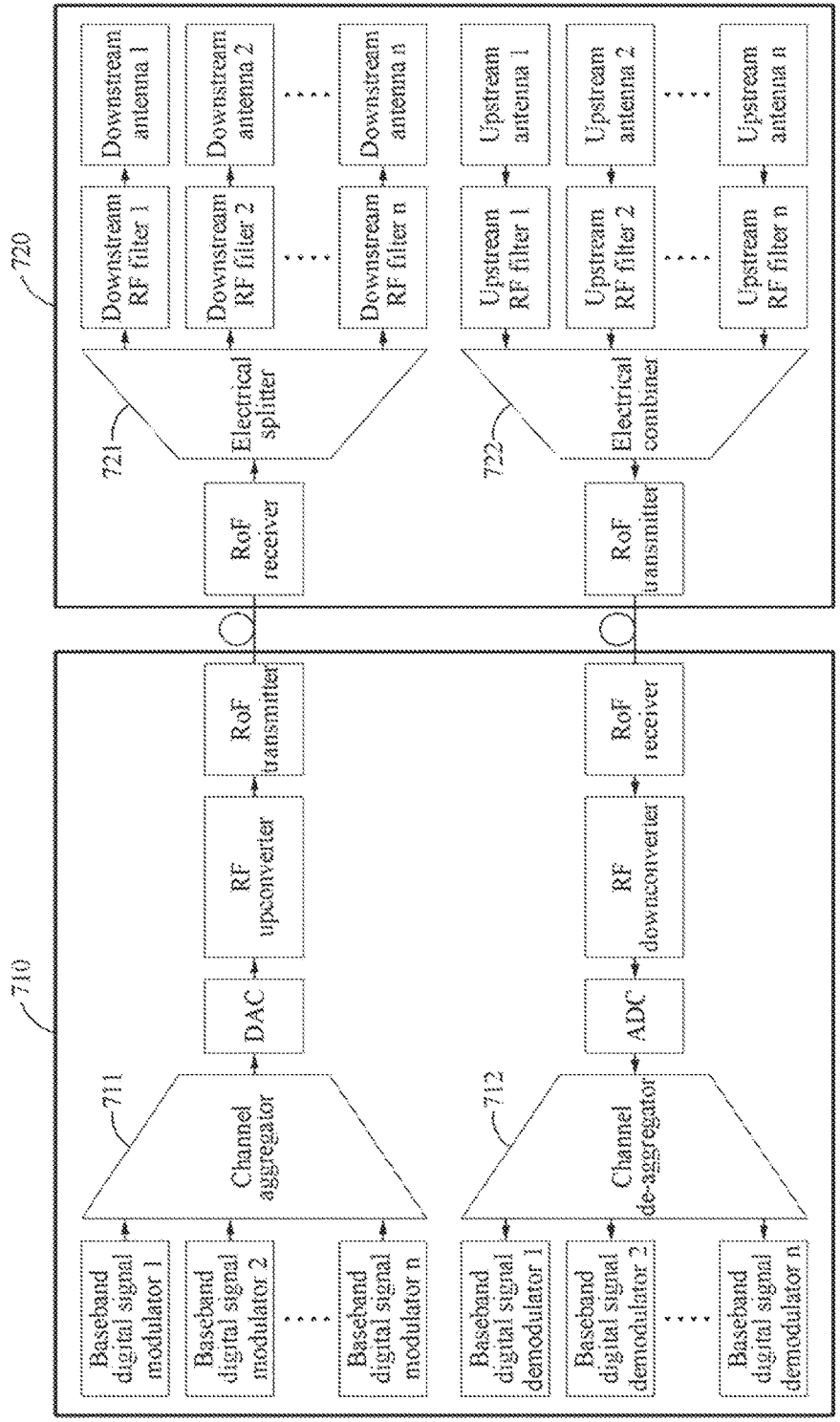
FIG. 7 is a diagram illustrating a configuration of an RFoF based multi-channel RoF transmission system according to an example embodiment.

FIG. 7 is a diagram illustrating a configuration of an RFoF based multi-channel RoF transmission system according to an example embodiment. To implement a high-capacity RoF transmission system, the RoF transmission system may employ channel aggregation or multiplexing.

In a downstream direction, when comparing the RFoF based single channel RoF transmission system of FIG. 5 and the RFoF based multi-channel RoF transmission system of FIG. 7, a BBU 710 using multiple channels may further include a channel aggregator 711 configured to aggregate digital downlink signals transmitted from a plurality of baseband digital signal modulators. The channel aggregator 711 may aggregate or multiplex the plurality of digital baseband mobile signals in an electrical signal domain. The aggregated or multiplexed digital baseband mobile signal may be converted into an analog signal by a DAC, and then converted into a radio signal with an allowable frequency by an RF upconverter. The radio signal may be converted into an optical signal, and transmitted to an RRH 720 via an RoF transmitter.

In relation to the channel aggregator 711, the RRH 720 using multiple channels may further include an electrical splitter 721 configured to split the aggregated signal received by an RoF receiver. The RRH 720 may convert the analog downlink signal received via the RoF receiver into an electrical signal. The electrical signal may be distributed to a plurality of downstream RF filters by the electrical splitter 721. The electrical signals may be filtered by the downstream RF filters, pass through downstream antennas, and be transmitted to user terminals based on respective RFs of the downstream antennas.

In an upstream direction, when comparing the RFoF based single channel RoF transmission system of FIG. 5 and the RFoF based multi-channel RoF transmission system of FIG. 7, the RRH 720 using multiple channels may further include an electrical combiner 722 configured to combine radio signals received via a plurality of upstream antennas. The RRH 720 may receive a plurality of analog radio signals generated by a plurality of user terminals via the upstream antennas. The analog radio signals received via the upstream antennas may be filtered by upstream RF filters, and combined by the electrical combiner 722. An RoF transmitter of the RRH 720 may convert a signal into which the analog radio signals are combined into an optical uplink signal.

In relation to the electrical combiner 722, the BBU 710 using multiple channels may further include a channel de-aggregator 712 configured to distribute a combined digital uplink signal to a plurality of baseband digital signal demodulators. An RoF receiver of the BBU 710 may receive the optical uplink signal from the RRH 720. The optical uplink signal may be converted into an electrical signal by the RoF receiver. An RF downconverter may convert a frequency of the electrical signal to a frequency corresponding to a baseband. An ADC may convert the analog electrical signal from the RF downconverter into a digital baseband signal. Finally, the channel de-aggregator 712 may de-aggregate or de-multiplex the digital baseband signal, and distribute digital baseband signals to a plurality of baseband digital signal demodulators. The plurality of baseband digital signal demodulators may demodulate the digital baseband signals received from the channel de-aggregator 712, respectively.

Figure 8:
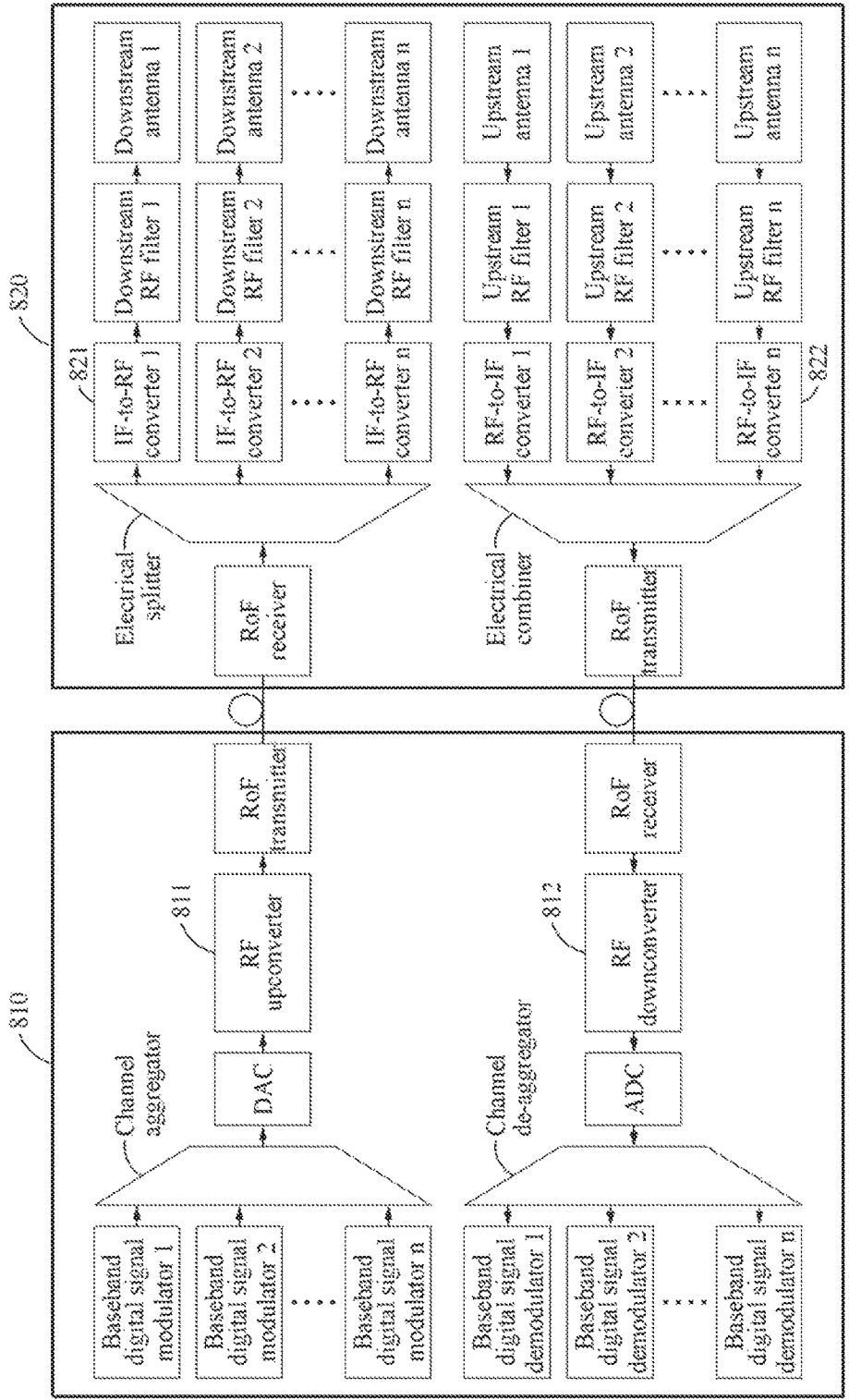
FIG. 8 is a diagram illustrating a configuration of an IFoF based multi-channel RoF transmission system according to an example embodiment.

FIG. 8 is a diagram illustrating a configuration of an IFoF based multi-channel RoF transmission system according to an example embodiment.

In a downstream direction, a signal into which a plurality of signals are multiplexed by a channel aggregator of a BBU 810 may be converted into an analog signal by a DAC. An IF upconverter 811 may convert a frequency of the analog signal to an IF, and thus the optical signal transmission efficiency may improve. The operations of the DAC and the IF upconverter 811 may be performed simultaneously.

An RoF transmitter of the BBU 810 may convert the IF electrical signal into an optical signal, and transmit the optical signal to an RRH 820. The optical signal transmitted from the BBU 810 to the RRH 820 via an optical fiber may be an analog optical signal. The RRH 820 may receive the optical signal via an RoF receiver, and the RoF receiver may convert the received optical signal into an electrical signal. An electrical splitter may distribute the electrical signal to a plurality of IF-to-RF converters 821. The IF-to-RF converters 821 may convert frequencies of the electrical signals from IFs to RFs of downstream antennas corresponding to the IF-to-RF converters 821. Finally, the RF electrical signals may be filtered by downstream RF filters, and transmitted to user terminals via the downstream antennas.

In an upstream direction, the RRH 820 may receive a plurality of analog radio signals generated by terminals of a plurality of subscribers via a plurality of upstream antennas. The plurality of analog radio signals received via the plurality of upstream antennas may be filtered by upstream RF filters, and frequencies of the plurality of analog radio signals may be converted from RFs to IFs by RF-to-IF converters 822. The plurality of IF electrical signals may be combined into a signal by an electrical combiner, and the signal into which the IF electrical signals are combined may be converted into an optical signal and transmitted to the BBU 810 by an RoF transmitter.

The BBU 810 may receive the optical signal via an RoF receiver. The RoF receiver may convert the received optical signal into an electrical signal. An IF downconverter 812 may convert the IF of the electrical signal to a frequency corresponding to a baseband. An ADC may convert the baseband analog signal into a baseband digital signal. The baseband digital signal may be distributed to a plurality of baseband digital signal demodulators by a channel de-aggregator. Finally, the plurality of baseband digital signal demodulators may demodulate the baseband digital signals, respectively.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An analog radio-over-fiber (RoF) transmission system comprising:

an optical line terminal (OLT) configured to convert a radio signal received from at least one BBU (Baseband Unit) into an optical signal;

an optical distribution network (ODN) comprising an optical fiber and an optical splitter: and at least one optical network unit (ONU) configured to receive the optical signal transmitted from the OLT via the ODN and to convert the optical signal into a radio signal and to output the radio signal to at least one of RRH (Remote Radio Head), wherein the BBU is connected to a core network of a service provider that provides mobile internet services, wherein the OLT is connected to the at least one BBU via a service node interface (SNI) corresponding to a first reference point, wherein the ONU is connected to the at least one RRH via a user node interface (UNI) corresponding to a second reference point, and wherein the SNI and the UNI are set differently based on the service provided by the service provider, wherein the first reference point and the second reference point are used to define a signal type and allowable signal delay or latency within the analog RoF system, wherein the analog RoF transmission system has (i) a point-to-point configuration comprising a single OLT, and a single ONU connected to the ODN and (ii) a point-to-multipoint comprising a single OLT and a plurality of ONU connected to the ODN, wherein an interface S/R is located between the OLT and the ODN, an interface R/S is located between the ODN and the ONU wherein the interface S is a point on the optical fiber immediately subsequent to an optical connection point of the OLT (downstream") or the ONU (upstream) including an optical connector, or optical splice, and the interface R is a point on the optical fiber immediately subsequent to an optical connection point of the ONU (downstream) or the OLT (upstream) including an optical connector, or optical splice, wherein the analog RoF system is applied to wavelength-division-multiplexing (WDM) wherein the analog RoF system is applied to electrical combiner configured to combine radio signals, and electrical splitter configured to splitter the radio signal, wherein a frequency in the optical signal transmitted via the ODN is same as or is different from a frequency of the radio signal used by the ONU, wherein the RRH includes a radio frequency (RF1 circuitry, a frequency up/down converter, a plurality of antennas equipped with amplifiers to support a multiple-input and multiple-output (MIMO) configuration, a power amplifier and a noise amplifier.

* * * * *